(12) United States Patent
Gosian et al.

(10) Patent No.: US 11,125,623 B2
(45) Date of Patent: Sep. 21, 2021

(54) SATELLITE ONBOARD IMAGING SYSTEMS AND METHODS FOR SPACE APPLICATIONS

(71) Applicant: L3 Cincinnati Electronics Corporation, Mason, OH (US)

(72) Inventors: Gregory Gosian, Morrow, OH (US); Dave Hartup, West Chester, OH (US)

(73) Assignee: L3 Cincinnati Electronics Corporation, Mason, OH (US)

( * ) Notice: Subject to any disclaimer, the term of this patent is extended or adjusted under 35 U.S.C. 154(b) by 313 days.

(21) Appl. No.: 16/018,755

(22) Filed: Jun. 26, 2018

(65) Prior Publication Data

US 2018/0372548 A1 Dec. 27, 2018

Related U.S. Application Data

(60) Provisional application No. 62/524,709, filed on Jun. 26, 2017.

(51) Int. Cl.
| | |
|---|---|
| *G01J 5/00* | (2006.01) |
| *G01J 5/08* | (2006.01) |
| *G01J 5/10* | (2006.01) |
| *H04N 7/18* | (2006.01) |
| *H04N 5/33* | (2006.01) |
| *F41H 11/02* | (2006.01) |

(52) U.S. Cl.
CPC ............ *G01J 5/007* (2013.01); *G01J 5/0022* (2013.01); *G01J 5/0806* (2013.01); *G01J 5/10* (2013.01); *H04N 5/33* (2013.01); *H04N 7/183* (2013.01); *H04N 7/185* (2013.01); *F41H 11/02* (2013.01); *G01J 2005/0077* (2013.01); *G01J 2005/106* (2013.01)

(58) Field of Classification Search
None
See application file for complete search history.

(56) References Cited

U.S. PATENT DOCUMENTS

| | | | |
|---|---|---|---|
| 5,960,097 A | 9/1999 | Pfeiffer et al. | |
| 6,034,372 A * | 3/2000 | LeVan | G01J 5/08 250/338.1 |
| 7,049,597 B2 | 5/2006 | Bodkin | |
| 7,804,053 B2 | 9/2010 | Baker et al. | |
| 8,831,370 B2 | 9/2014 | Archer | |
| 2009/0212219 A1* | 8/2009 | Cook | G02B 13/04 250/351 |

(Continued)

*Primary Examiner* — Heather R Jones
(74) *Attorney, Agent, or Firm* — Dinsmore & Shohl LLP

(57) ABSTRACT

Satellite onboard imaging systems having a look-down view and a toroidal view of the Earth are disclosed. In one embodiment, a satellite onboard imaging systems include an infrared sensing system and a controller. The infrared sensing system includes a first imager configured to have a first field of view that observes a look-down view of the Earth from a satellite and a second imager configured to have a second field of view that observes a toroidal view of the Earth centered at the satellite. The controller is coupled to the first imager and the second imager and operable to process image data from the first imager and the second imager. The controller is further operable to output indications of thermal energy of an identical, or different objects based on the first thermal image signal, the second thermal image signal, or both.

13 Claims, 14 Drawing Sheets

(56) References Cited

U.S. PATENT DOCUMENTS

2012/0207401 A1* 8/2012 Archer .................. G02B 27/48
                                                            382/254
2014/0086454 A1    3/2014  Bauer et al.
2015/0350569 A1   12/2015  Espersen et al.

\* cited by examiner

SATELLITE ONBOARD IMAGING SYSTEMS AND METHODS FOR SPACE APPLICATIONS

CROSS-REFERENCE TO RELATED APPLICATIONS

This application claims the benefit of U.S. Provisional Application Ser. No. 62/524,709, filed on Jun. 26, 2017 and entitled, "360 DEGREE TOROIDAL FIELD OF VIEW FOR SPACE APPLICATION," which is incorporated by reference in its entirety.

TECHNICAL FIELD

Embodiments described herein generally relate to satellite onboard imaging systems and methods for space applications and, more specifically, to satellite onboard imaging systems and methods for providing a 360 degree toroidal field of view for space applications.

BACKGROUND

Imaging systems including electro-optical sensor systems are used for detecting an object and/or tracking movement of the object. In particular, infrared sensing systems track objects by detecting emitted heat energy, which do not require reflected heat energy such as from the sun, but can generally operate also in the presence of reflected energy if an object's combination of emitted and reflected heat energy can be distinguished from background energy levels. Infrared detectors today are used in a wide variety of security, surveillance, military, and commercial applications. The ability to detect thermally emitted infrared light makes the infrared sensing system desirable for night vision, detection, tracking, search and rescue, nondestructive evaluation, gas analysis, and condition monitoring, etc.

An infrared sensing system may use a single infrared (IR) band, a dual IR band, or multiple bands. A commonly used IR band includes near-infrared band (NIR) having wavelengths of 700~1100 nm, short-wavelength infrared (SWIR) band having the wavelength spectrum of 900~2500 nm, mid-wavelength infrared (MWIR) band having the wavelength spectrum of 3000~5000 nm, long-wavelength infrared (LWIR) band having the wavelength spectrum of 7000~14,000, and far infrared (FIR) band having the wavelength spectrum of 14,000 nm and up. In particular, the MWIR and LWIR bands are referred to as thermal IR bands, which have the wavelength spectrum from about 3~14 μm. At ambient-temperature, objects often emit sufficient amounts of thermal radiation to be reliably detected in many scenarios.

Satellites may use infrared sensing to monitor an object either on the Earth, above the Earth, or orbiting around the Earth. However, to obtain a full view of the Earth, satellites may include complicated mechanical components to rotate imaging systems in a "step-and-stare" approach. These mechanical components may fail and may be costly to implement.

SUMMARY

A satellite onboard imaging system includes an infrared sensing system and a controller. The infrared sensing system includes a first imager configured to have a first field of view that observes a look-down view of the Earth from a satellite and a second imager configured to have a second field of view that observes a toroidal field of view of the Earth centered at the satellite. The first imager is operable to generate a first thermal image signal. The second imager is operable to generate a second thermal image signal. The controller is coupled to the first imager and the second imager and operable to process the first thermal image signal from the first imager and the second thermal image signal from the second imager. The controller is further operable to output indications of thermal energy of an identical, or different objects based on the first thermal image signal, the second thermal image signal, or both.

In another embodiment, the second imager further includes an annulus lens system and a focal plane array that detects longwave infrared radiation, where the annulus lens system maps the longwave infrared radiation onto a two-dimensional plane of the focal plane array.

In another embodiment, the second imager comprises a longwave infrared focal plane array and the first imager comprises an infrared focal plane array that detects an infrared waveband shorter than the longwave infrared.

In another embodiment, the first imager detects midwave infrared radiation within the look-down field of view and the second imager detects longwave infrared radiation within the toroidal field of view.

In another embodiment, the satellite onboard imaging system further includes a single focal plane array having a first area having pixels configured to detect the midwave infrared radiation, and a second area having pixels configured to detect the longwave infrared radiation.

In another embodiment, the pixels of the single focal plane array are dual band pixels.

A space imaging system includes a first satellite including a first onboard imaging system, a second satellite including a second onboard imaging system, and a terrestrial station. The terrestrial station includes one or more terrestrial stations. The terrestrial station is in communication with the first satellite and the second satellite and operable to receive first parameters relating to infrared radiation detected by the first onboard imaging system and to receive from the second satellite second parameters relating to infrared radiation detected by the second onboard imaging system. Each of the first onboard imaging system and the second onboard imaging system includes an infrared sensor that operates in a look-down field of view and a toroidal field of view.

In another embodiment, the first onboard imaging system includes a pair of imagers having a first imager and a second imager, and the first imager includes a first lens system and a first MWIR detector, and the second imager includes a second lens system and a second LWIR detector.

In another embodiment, the second onboard imaging system includes a single imager, and the single imager includes a lens system through which MWIR radiation and LWIR radiation propagate and a focal plane array that detects both the MWIR radiation and the LWIR radiation.

In another embodiment, the first parameters include midwave infrared radiation resulting from launch of a missile in the look-down field of view and detected with the first MWIR detector and longwave infrared radiation resulting from mid-course phase of flight of the missile in the toroidal field of view and detected with the first LWIR. It should be noted that this disclosure pertains to several space applications including detection of missile launch, tracking of many types of missiles (ballistic, hypersonic glide, hypersonic cruise, etc.) during the mid-course phase of flight, and space situational awareness.

In another embodiment, the terrestrial station is operable to determine a direction of the missile to a target based on the first parameters. The terrestrial station is operable to determine and track a position and a trajectory of the missile during mid-course phase of flight based on the first parameters and the second parameters.

In another embodiment, the first onboard imaging system is operable to detect a target in the toroidal field of view with space coverage between a minimum altitude corresponding to a top layer of atmosphere and a predetermined maximum altitude.

In another embodiment, a satellite onboard imaging method includes steps of (i) detecting, with a satellite onboard imaging system, MWIR radiation from the Earth within a look-down field of view from a satellite, (ii) generating a first thermal image signal based on the detected MWIR radiation, (iii) detecting, with the satellite onboard imaging system, LWIR radiation from an annulus above the surface of the Earth within a toroidal field of view from the satellite, (iv) generating a second thermal image signal based on the detected LWIR radiation, (v) processing the first thermal image signal and the second thermal image signal; and (vi) outputting an indication of a thermal energy based on the first thermal image signal, the second thermal image signal, or both.

In another embodiment, the satellite onboard imaging method further includes (i) analyzing the first thermal image signal to capture first set of information of a first object within the look-down field of view, and (ii) analyzing the second thermal image signal to capture second set of information of a second object within the toroidal field of view. One or more objects can be found in each field of view.

In another embodiment, detecting the MWIR radiation further includes detecting the MWIR radiation with a first infrared sensor and detecting the LWIR radiation further includes detecting the LWIR radiation with a second infrared sensor.

In another embodiment, detecting the MWIR radiation and the LWIR radiation is performed with a single focal plane array.

In another embodiment, the satellite onboard imaging method further includes detecting infrared radiation resulting from an identical object moving through a toroidal view of the onboard imaging system of at least two satellites having different fields of view of the Earth.

In another embodiment, the satellite onboard imaging method further includes the steps of (i) detecting, with the satellite onboard imaging system, MWIR radiation of a missile within the look-down field of view, (ii) detecting, with the satellite onboard imaging system, LWIR radiation of the missile within the toroidal field of view, (iii) analyzing the first thermal image signal to determine launch of the missile, and (iv) analyzing the second thermal image signal to determine a flight direction of the missile. The satellite onboard imaging method further includes detecting, with the individual imaging system boarded on the network of satellites, LWIR radiation of the missile moving through the toroidal field of view of the individual imaging system, and determining a position and a trajectory of the missile during the mid-course phase of flight based on the second thermal image signal from the network of satellites.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood in conjunction with the following drawings, where like structure is indicated with like reference numerals and in which.

DETAILED DESCRIPTION

Embodiments disclosed herein include systems and methods for detecting an object with infrared sensing systems having two different fields of view. The infrared sensing systems are provided on satellites to detect infrared signals on and surrounding the Earth. One of the different fields of view includes a toroidal or panoramic view covering an annulus around a satellite. Some embodiments of the infrared sensing systems include a pair of imagers. In embodiments, the infrared sensing system includes a single imager to obtain two different views. The infrared sensing systems may detect midwave infrared radiation and longwave infrared radiation. Different infrared bands are associated with different fields of view. In some embodiments, one field of view is associated with detection of midwave infrared radiation, and the other field of view is associated with detection of longwave infrared radiation.

The detection of longwave infrared radiation in the toroidal view facilitates various space applications including space situational awareness and a missile launch and tracking. For instance, the detection of longwave infrared radiation in the toroidal view with at least two satellites enables a position and a trajectory of a missile to be determined during mid-course phase of flight of the missile. The systems and methods for detecting an object with infrared sensing systems using the toroidal view and incorporating the same will be described in more detail, below.

Figure 1:
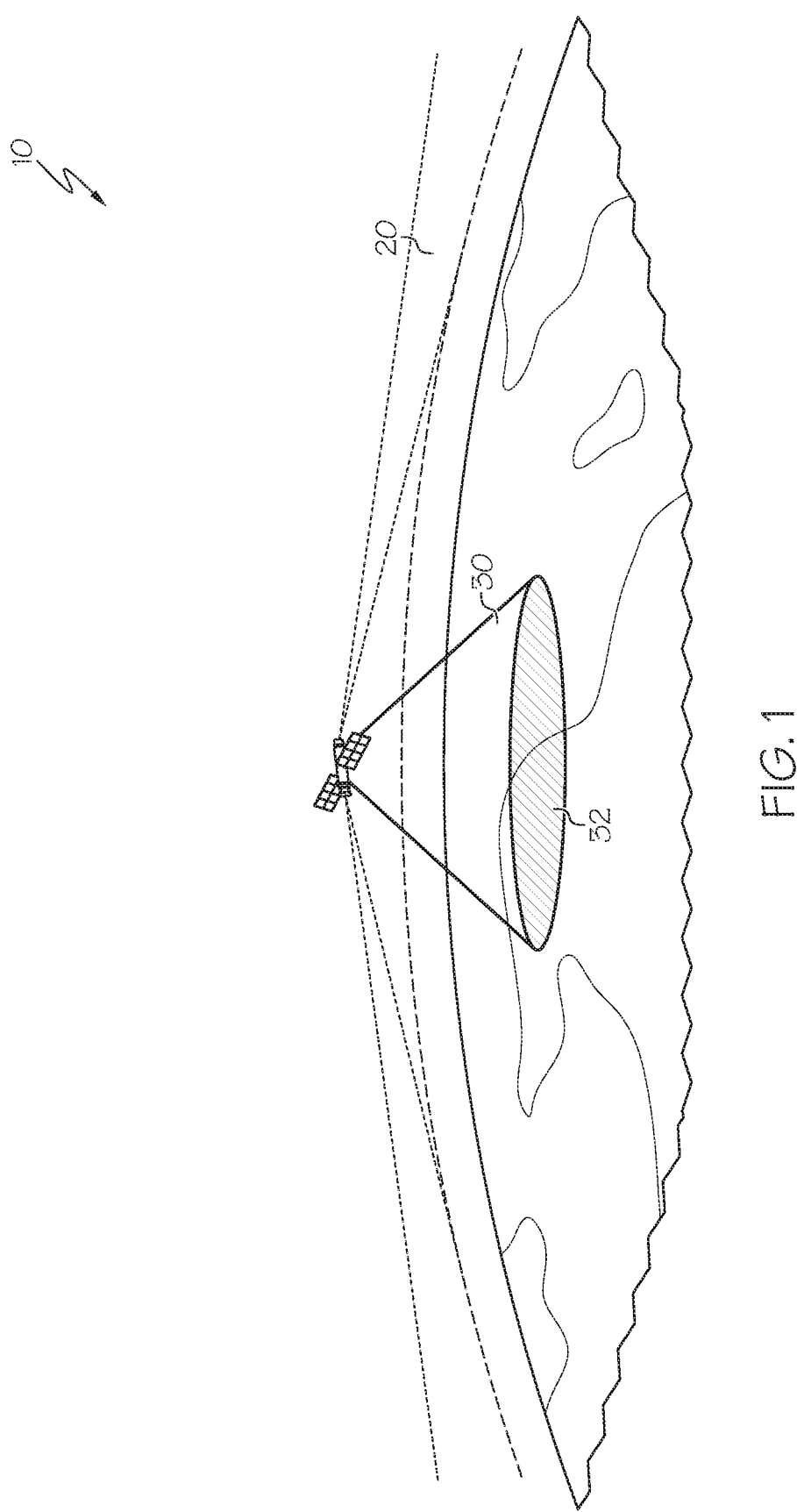
FIG. 1 depicts a satellite onboard imaging system having two different fields of view including a look-down field of view and a toroidal field of view, according to embodiments described and illustrated herein.

FIG. 1 depicts a satellite onboard imaging system 10 having two different fields of view 20, 30 according to some embodiments of the present disclosure. In some embodiments, one field of view includes a look-down field of view 30 and the other field of view includes a toroidal field of view 20. As shown in FIG. 1, the toroidal field of view 20 includes a view above the surface of the Earth. In some embodiments, the toroidal field of view 20 includes a view above the atmospheric level of the Earth as shown in FIG. 1. In some embodiments, the toroidal view may include a 360 degree view. The look-down field of view 30 covers an area located on or above a certain surface area 32 of the Earth. As discussed above more in detail, the satellite onboard imaging system 10 may include an infrared sensing system.

As shown in FIG. 1, the satellite onboard imaging system 10 is hosted on a satellite and observes an annulus of space in located above the surface of the Earth. The look-down field of view 30 supports imaging that looks down from the satellite. By way of example only, the look-down field of view may be about 120 degrees for a typical system in Low Earth Orbit (LEO). In some embodiments, the toroidal field of view may support imaging that looks 360 degrees out and provide a panoramic field of view, as shown in FIG. 1. As will be further explained below in connection with FIG. 14, by way of example, one axis of the toroidal field of view may be narrow, but the other axis will be 360 degrees.

Figure 2:
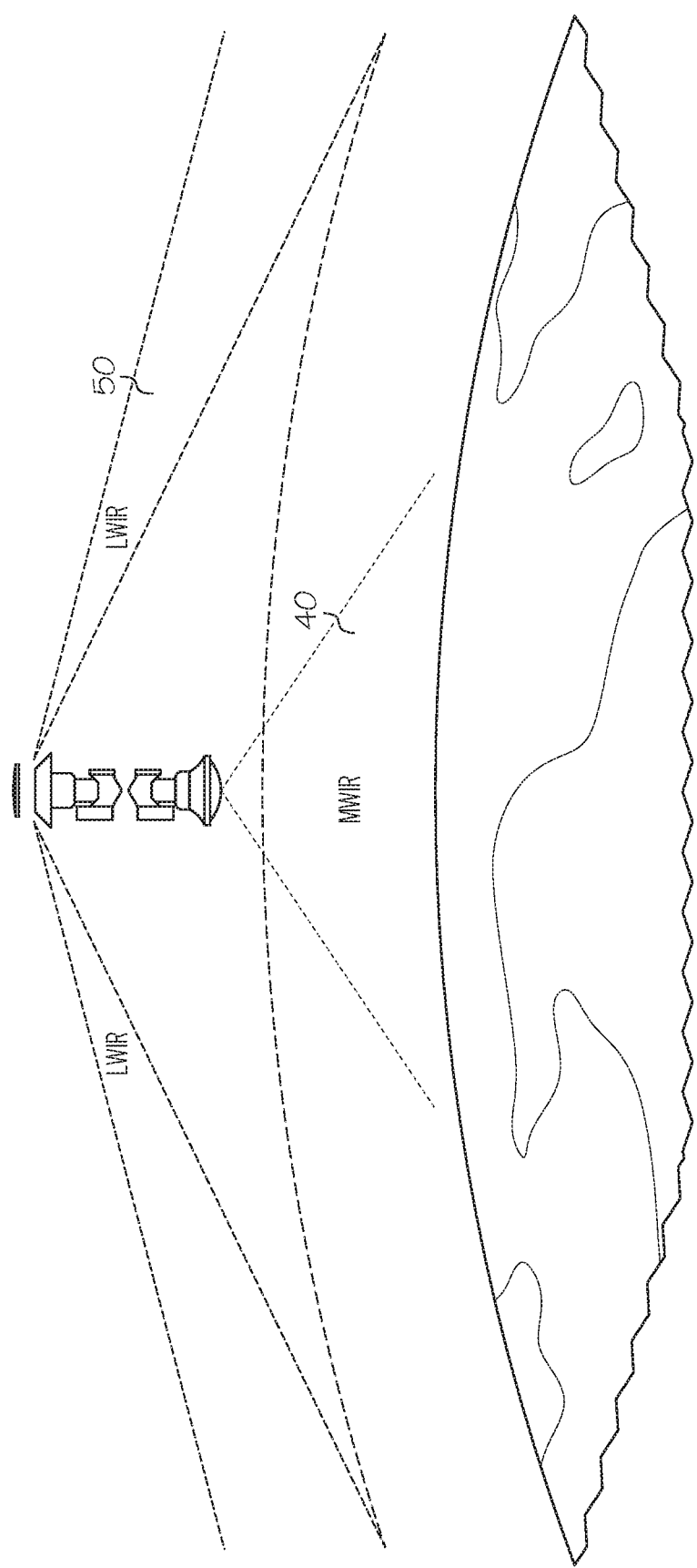
FIG. 2 depicts a single-satellite configuration having a satellite onboard imaging system associated with different infrared bands, according to embodiments described and illustrated herein.

FIG. 2 schematically depicts an example satellite onboard imaging system 10 that detects two different infrared radiation bands 40, 50 associated with different fields of view. In some embodiments, a look-down field of view of FIG. 1 detects mid-wave infrared (MWIR) radiation 40 and a toroidal field of view detects long-wave infrared (LWIR) radiation 50. The satellite onboard imaging system 10 includes infrared sensing systems that detect MWIR radiation 40 and LWIR radiation 50 and generates thermal image data. In some embodiments, the satellite onboard imaging system 10 includes a pair of imagers, and each imager detects MWIR radiation and LWIR radiation, respectively. In other embodiments, the satellite onboard imaging system 10 includes a single infrared sensing system that detects both MWIR radiation 40 and LWIR radiation 50 with a single infrared sensor, as described in more detail below.

Figure 3:
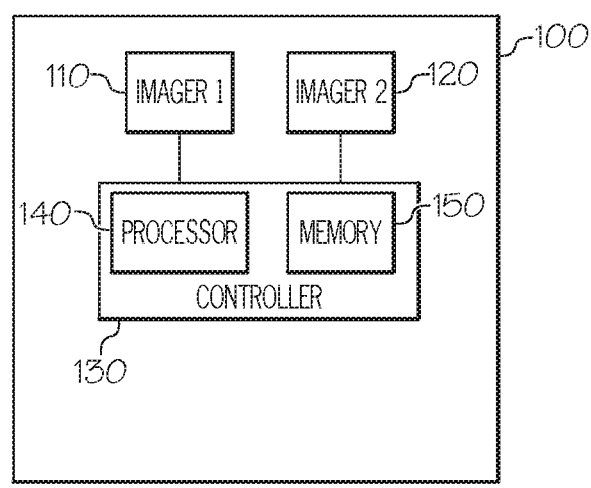
FIG. 3 depicts an exemplary block diagram of a satellite onboard imaging system having a pair of imagers according to embodiments described and illustrated herein.

FIG. 3 illustrates one exemplary block diagram of an exemplary satellite onboard imaging system 100. In some embodiments, the satellite onboard imaging system 100 includes a pair of imagers having a first imager 110 and a second imager 120. The satellite onboard imaging system 100 further includes a controller 130 having a processor 140 and a memory 150, as shown in FIG. 3. The controller 130 is coupled to the pair of imagers 110, 120 to receive thermal image data. In some embodiments, the controller 130 may be also communicatively coupled to a remote display device which is located on a terrestrial station for displaying an indication of thermal energy detected by the first imager 110 and/or the second imager 120. In other embodiments, the controller 130 may be coupled to a user interface, and the purpose and nature of the user interface is not limited to a display device. For instance, the controller 130 may be coupled to a system for issuing warnings or notifications.

In some embodiments, the first imager 110 and the second imager 120 operate to provide different fields of view which cover different areas of and around the Earth. As shown in FIG. 1, the first imager 110 has a look-down field of view 30 and the second imager 120 has a toroidal field of view 20. Additionally, or alternatively, the first imager 110 and the second imager 120 sense different wavelength spectrums of infrared radiation, as shown in FIG. 2. As shown in FIG. 3, the first imager 110 may include a focal plane array (FPA) that detects MWIR and the second imager 120 may include a FPA that detects LWIR. In some embodiments, the pair of imagers 110, 120 are Integrated Dewar Electronics Cooler Assemblies (IDECAs). In some embodiments, the pair of imagers 110, 120 is disposed on a single platform, such as a single satellite.

Based on the above, the first imager 110 provides thermal imaging data resulting from detection of mid-wave infrared radiation within the look-down field of view, and the second imager 120 generates thermal image data resulting from detection of long-wave infrared radiation within the toroidal field of view. Accordingly, the satellite onboard imaging system 100 is able to capture an indication of thermal energy of an object in the look-down field of view. Moreover, the satellite onboard imaging system 100 is able to capture an indication of thermal energy of an object in the field of view surrounding the satellite where the satellite is the center of the annulus 20 as shown in FIG. 1. In some embodiments, such different fields of view enable a single satellite to capture thermal images of an object in the look-down field of view and then further capture an indication of thermal energy of the same object in the toroidal view. By way of example, the satellite hosting the imaging system 100 may capture, with a LWIR imager, an indication of a thermal energy from an object in altitude ranges between 1000 km and 5100 km from the surface of the Earth. In particular, the toroidal field of view may provide views encompassing 360 degrees out, thereby expanding a field of view and maximizing the detection potential of infrared radiation. This capability of the satellite onboard imaging system 100 is particularly useful for various space applications. For example, the satellite onboard imaging system 100 may be used for mid-course tracking of a missile, as further discussed more in detail. The capability of the satellite onboard imaging system 100 is also well suited to provide improved space situational awareness.

Figure 4:
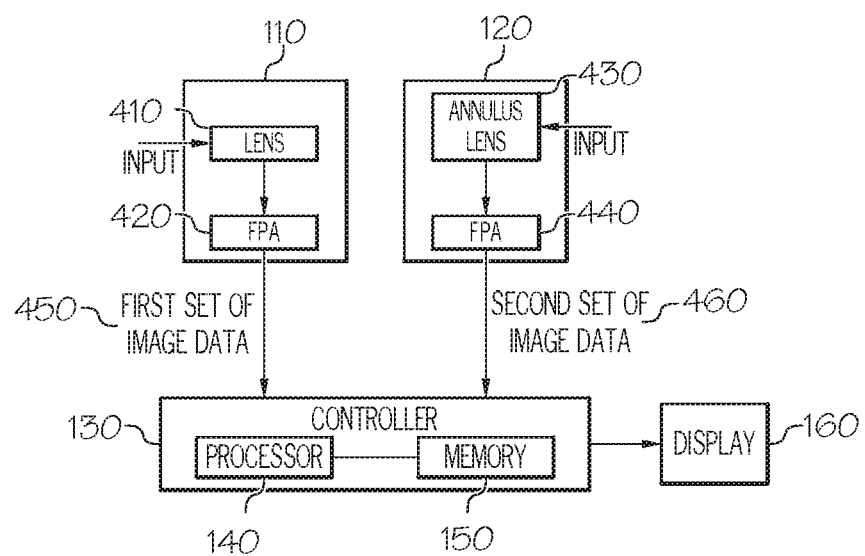
FIG. 4 depicts an exemplary block diagram of the pair of imagers of FIG. 3 according to embodiments and illustrated described herein.

FIG. 4 further illustrates detailed structures of the pair of imagers 110, 120 as shown in FIG. 3. As shown in FIG. 4, the first imager 110 includes a lens system 410 and a FPA 420. The second imager 120 includes an annulus lens system 430 and a FPA 440. In the first imager 110, MWIR is input to the lens system 410 and propagates through the lens system 410 to reach the FPA 420. The FPA 420 detects MWIR that is propagated through the lens system 410.

FPAs can provide optimal photon-noise-limited performance that may enable many space applications. The FPA architecture generally includes a detector layer and an integrated circuit. The detector layer detects light and generates and collects charge, and the integrated circuit changes the charge to a voltage as a signal. As a non-limiting example, FPA architecture supporting the resolution of 2,048×2,048 pixels may be used. Infrared FPAs available in the relevant technical field may provide a high level of quality and have good quantum efficiency, low readout noise and low dark current.

In some embodiments, the second imager 120 includes the annulus lens system 430 coupled to the FPA 440 which detects LWIR. In the second imager 120, LWIR is input to the annulus lens system 430 through which LWIR propagates and is mapped onto the FPA 440. As the second imager 120 is equipped with the toroidal field of view, a three-dimensional view is essentially mapped onto a two-dimensional focal plane of the FPA 440. The FPA 440 includes a detector layer that detects LWIR and an integrated circuit that converts the detected optic information to an electric signal in analog form, or digital form.

The FPA 420 and the FPA 440 may be structured and selected to take several parameters into consideration in their implementations with the first imager 110 and the second imager 120. In some embodiments, the parameters may include a pixel pitch, a number of pixels, an amount of dark current, quantum efficiency, fill-factor, integration time, required lens focal length and F-number (F/#), required well capacity of detectors, etc.

As shown in FIG. 4, a first set of image data 450 is generated from the first imager 110 and provided to the controller 130. Similarly, a second set of image data 460 is generated from the second imager 120 and provided to the controller 140. The first set of image data 450 and the second set of image data 460 may represent different indications of thermal energy information. In some embodiments, indications of thermal energy appear as a dot moving around on the display 160. For instance, an object such as a missile is considered as being relatively small compared to the area that a single pixel of the FPA is looking at and therefore, a single pixel may be displayed as a dot on the display 160. An object may take a fraction of the image space covered by a single pixel. In some embodiments, indications of thermal energy may be displayed on a display 160. For example, the display 160 is located in a terrestrial station for displaying relevant indications of thermal energy. The thermal images displayed on the display 160 may not show a specific shape of an object, but it may show emission of energy from and around an object. In some embodiments, data provided from the controller 130 is indicative of a missile and prompts actions, such as an alert to a warning system or other actions.

Referring again to FIG. 4, the annulus lens system 430 may permit a toroidal or panoramic field of view and may be referred to as a panoramic lens. Using the annulus lens system 430 may allow the satellite onboard imaging system 100 to avoid the need to move optical components to cover different fields of view (e.g., step-and-stare system designs) or may avoid the need to use multiple imagers to cover the a portion or all of the 360 degree field of view. Thus, embodiments may provide a simplified design. The use of an annulus lens also permits the entire annulus to be simultaneously mapped to the focal plane array 440, thereby avoiding outages associated with re-visit times that are inherent in step-and-stare system designs, and avoiding space, weight and power (SWaP) intensive configurations of distributed aperture designs.

Figure 5:
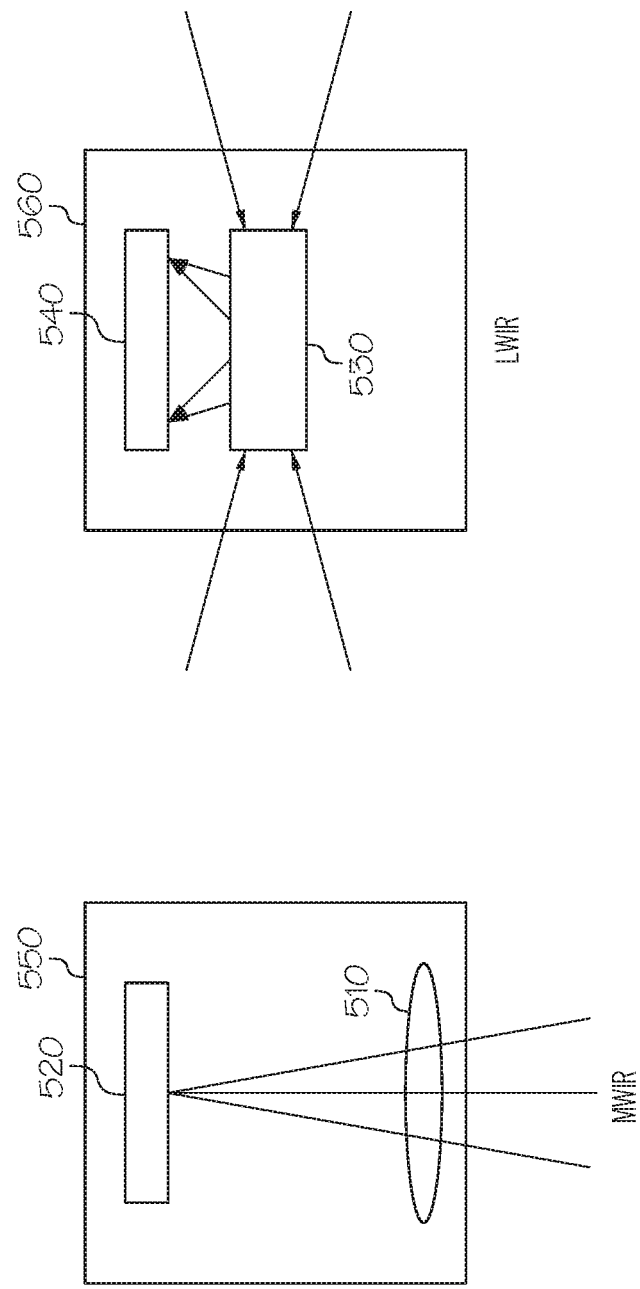
FIG. 5 further depicts exemplary structures of the pair of imagers of FIG. 3 according to embodiments and illustrated described herein.

FIG. 5 illustrates exemplary structures and operations of lens and focal plane array structures included in a pair of imagers 520, 540 according to embodiments described herein. A first imager 550 includes a MWIR lens system 510 and a MWIR FPA 520. As shown in FIG. 5, in the first imager 550, MWIR radiation enters through the lens system 510 and propagates to reach the MWIR FPA 520. A second imager 560 includes a LWIR lens system 530 and a LWIR FPA 540. As shown in FIG. 5, in the second imager 560, LWIR radiation enters through the lens system 530 and propagates to reach the LWIR FPA 540. Infrared radiation may enter the lens system 510 and 530 from many different entry points at different angles and reach at different points of each FPA 520, 540 based on the lens entry point of infrared radiation and optical characteristics of the lens system 510 and 530. The optical characteristics of the lens system 510, 530 are discussed to the extent that is needed to explain the embodiments of the present disclosure described herein. Appropriate lens focal length may be driven, selected and adjusted in light of entry and propagation of MWIR and LWIR. In addition, entry and propagation of infrared radiations as shown in FIG. 5 are by example only and simplified for convenience of explanation. The present disclosure is not limited to the illustration of FIG. 5 and descriptions provided herein.

Figure 6:
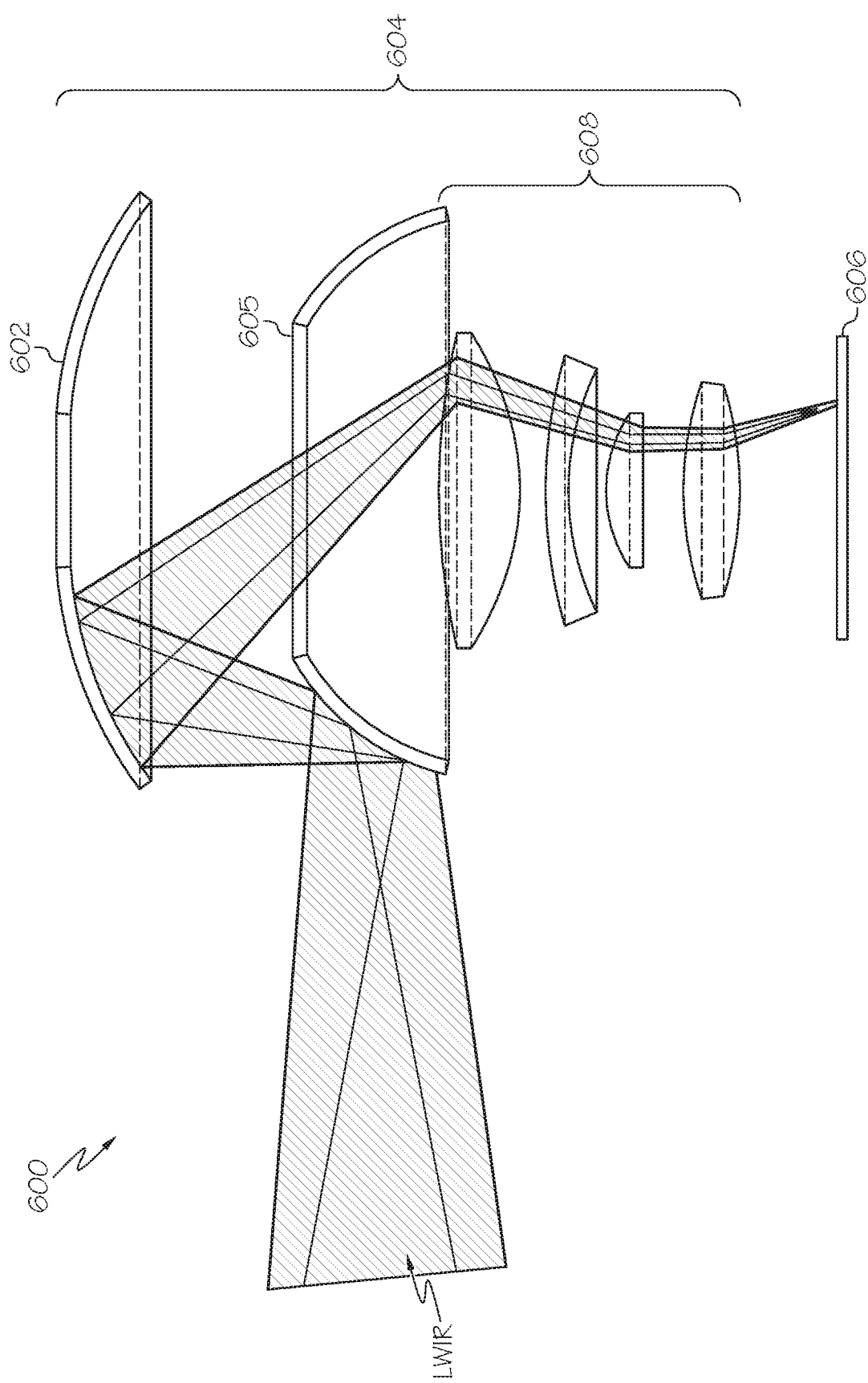
FIG. 6 depicts an exemplary annulus lens system and a focal plane array (FPA) used in one of the pair of imagers of FIG. 3 according to embodiments described and illustrated herein.

FIG. 6 illustrates an example imager 600 that includes an example annulus lens system 604 and a FPA 606 which can be used as one of the pair of imagers according to embodiments described herein (as shown in FIG. 3). As shown in FIG. 6, the annulus lens system 604 may be used to map the annulus to a FPA 606 and derive the lens focal length to the FPA 606. The example annulus lens system, 604 comprises a first reflective element 605, a second reflective element 602 and one or more transmissive lenses 608. As one example, IR radiation detected from an object in space (in all directions) is reflected by the first reflective element 605. The IR radiation is further reflected by the second reflective element 602 and propagates through several transmissive lenses 608. The IR radiation is mapped onto the FPA 606. To avoid energy outside the intended field of view, a classical Lyot coronagraph or Lyot stop could be used in some embodiments. The Lyot stop reduces the amount of flare caused by diffraction. The Lyot stop is located at the image of the objective formed by a field lens, with an aperture smaller than the objective image. It should be understood that other lens devices and techniques may be used to map the annulus to the FPA 606.

Figure 7:
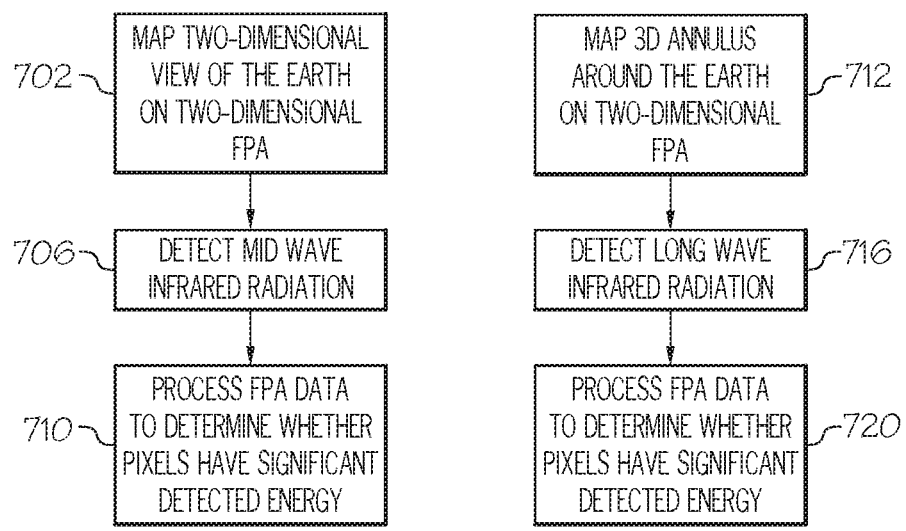
FIG. 7 depicts an exemplary flow chart of image processing by a satellite onboard imaging system, according to embodiments described and illustrated herein.

FIG. 7 depicts an exemplary flow chart of image processing by a satellite onboard imaging system, according to embodiments described herein. At block 702, infrared radiation detected from the look-down field of view is mapped onto the two-dimensional FPA that is sensitive and detects MWIR. The satellite onboard imaging system may have a looking-down field of view and covers a certain surface area of the Earth, as shown in FIGS. 1 and 2. At block 706, mid-wave infrared radiation (MWIR) is detected with the satellite onboard imaging system as shown in FIGS. 3-5. At block 710, FPA data is processed to determine which pixels have significant detected energy. For example, energy from an object such as a missile is detected in one pixel, or perhaps as many as four pixels if the object is straddling pixel boundaries, or perhaps the FPA also detects energy in the plume across multiple pixels. Alternatively, or additionally, the FPA data may be sent to one or more systems, such as warning systems.

At block 712, infrared radiation detected from the toroidal field of view is mapped onto the two-dimensional FPA. More specifically, the three-dimensional annulus around the Earth is mapped on the two-dimensional FPA that is sensitive and detects LWIR. At block 716, LWIR is detected with the imaging system as shown in FIGS. 3-5. The imaging system may have a toroidal field of view and covers an annulus above the surface of the Earth. In some embodiments, the imaging system has a panoramic field of view with 360 degree coverage. At block 720, FPA data is processed to determine which pixels have significant detected energy.

Figure 8A:
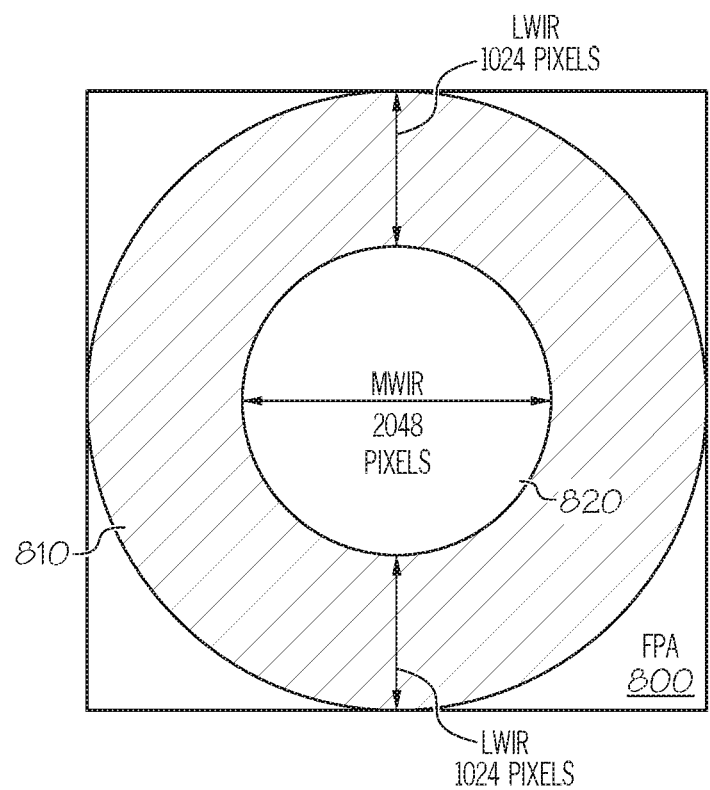
FIG. 8A depicts one exemplary mapping of an annulus to a focal plane array (FPA), according to embodiments described and illustrated herein.
Figure 8B:
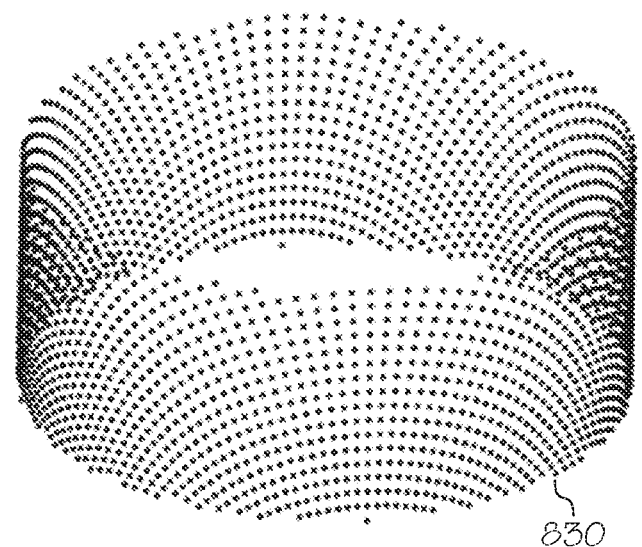
FIG. 8B depicts exemplary pixel density in focal plane array (FPA) space to image space torus pixel mapping, according to embodiments described and illustrated herein.

FIGS. 8A and 8B illustrate one embodiment of mapping of the annulus to a focal plane array (FPA) 800. In some embodiments, the FPA 800 includes an outer ring area 810 and an inner center area 820. The outer ring area 810 includes pixels that receive the LWIR annulus and the pixels in the outer ring area 810 are configured to detect LWIR. In some embodiments where MWIR energy is detected using a separate FPA, the pixels in the center may be inactive, or alternatively, the pixels in the center may be configured to detect LWIR but no signal is received there.

In some embodiments, the FPA may have the resolution of 4096×4096 pixels, although the resolution of the FPA is not limited thereto. In FIG. 8A, the diameter of the center area represents 2048 pixels and the diameter of the outer circle represents a total of 4096 pixels. FIG. 8A illustrates mapping the annulus field of view onto the FPA. The outer circumference of the FPA can be mapped to the bottom annulus or top annulus in the image space. Mapping of the bottom annulus may provide the highest resolution and smallest instantaneous field of view (IFOV), closest to the limb of the earth. This also may help in spatial resolution of the exo-atmospheric target, as well as making the task of occultation of earth radiance and albedo (sources of unwanted photons and noise) somewhat easier when compared with implementation of fewer pixels with larger IFOVs.

FIG. 8B illustrates pixel density in annulus of the image space. FIG. 8B further illustrates the pixel mapping between the FPA space image and the space torus. The pixels 830 correspond to the outer ring area 810 of FIG. 8A and appears as an annulus. As discussed above, each pixel covers a large space area and an object such as a missile may be significantly smaller than an area covered by a single pixel and appears as a fraction of a single pixel.

Figure 9:
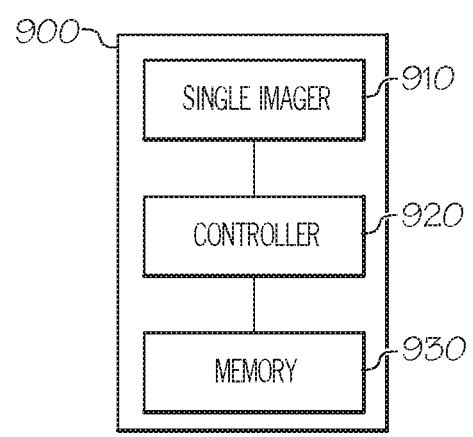
FIG. 9 depicts an exemplary block diagram of a satellite onboard imaging system having a single imager according to embodiments described and illustrated herein.

FIG. 9 illustrates another embodiment of a satellite onboard imaging system 900 according to embodiments described herein. The satellite onboard imaging system 900 includes a single imager 910, a controller 920, and a memory 930. An optional user interface device (not shown) may be provided to terrestrial operators at a station located on the Earth. As discussed in connection with FIG. 3, the imager 910 provides thermal image data to the controller 920 which processes and analyzes the thermal image data. In some embodiments, indications of thermal energy of an object may be generated and the result may be displayed on the user interface device. The user interface device includes a display device but it will not be limited to the display device. The user interface device may be implemented with user interface devices available in the art and suitable for space applications.

Figure 10:
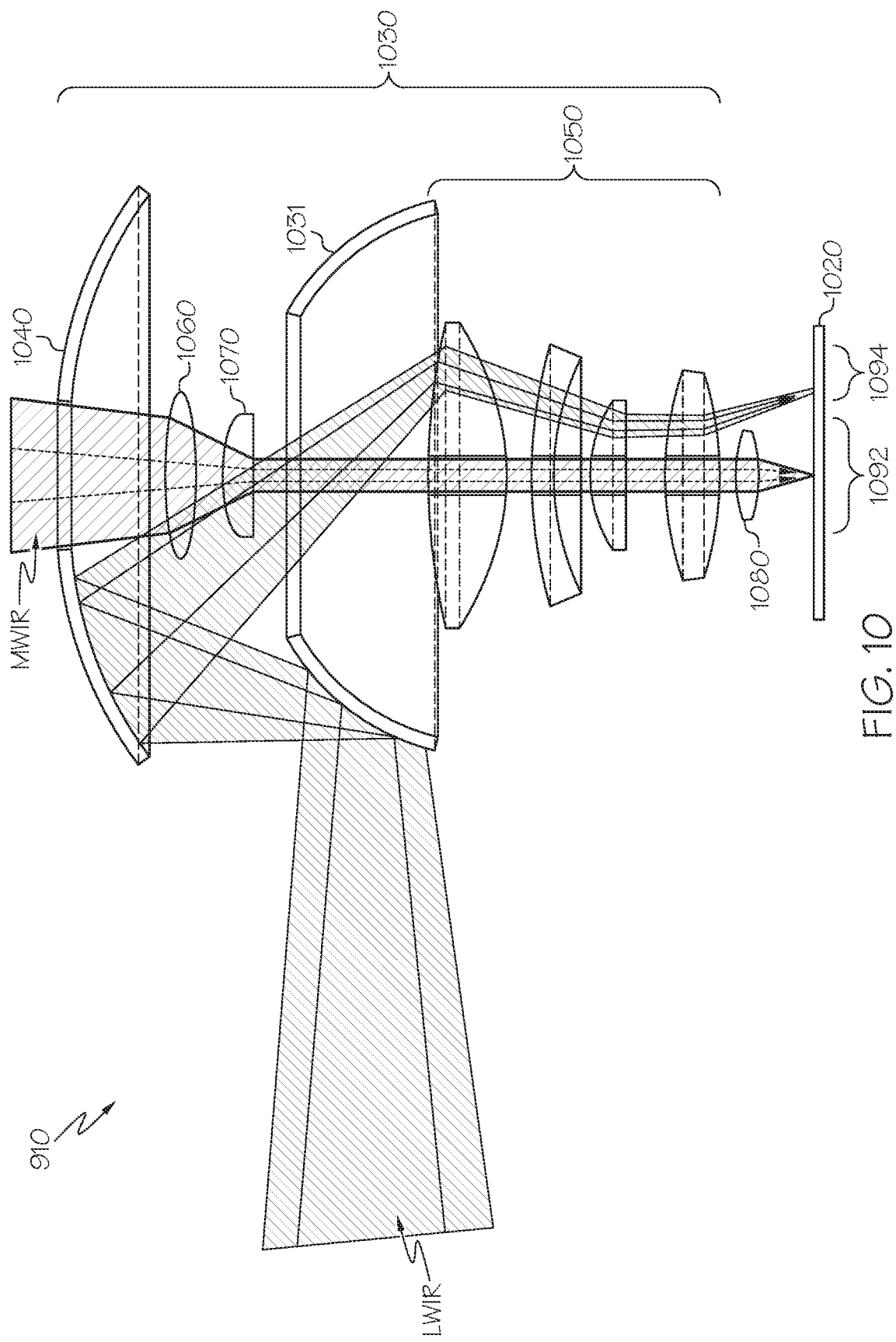
FIG. 10 depicts an exemplary structure of the single imager of FIG. 9 according to embodiments described and illustrated herein.

FIG. 10 depicts an exemplary structure of the single imager 910 of FIG. 9 according to embodiments. As shown in FIG. 10, the example single imager 910 comprises a lens system 1030 and a single FPA 1020. Any parts of the lens system 1030 where the middle bundle of rays passes may constitute part of a MWIR lens system. Any part of the lens system 1030 where the bundle of rays entering from the side passes may constitute part of an LWIR lens system. The lens system 1030 comprises a first reflective element 1031, a second reflective element 1040, and one or more transmissive elements 1050. The structure illustrated in FIG. 10 is by way of example only and the present disclosure is not limited thereto.

Referring to FIG. 10, operation of the single imager 901 is explained. MWIR radiation from Earth is propagated through the second reflective element 1040, a focusing lens 1060 and a collimating lens 1070. In some embodiments, the outer part of the second reflective element 1040 where the LWIR bundle hits is reflective, but the center part of the second reflective element 1040 where the MWIR bundle passes is transmissive. Alternatively, or additionally, the center part of the second reflective element 1040 may be empty space. The MWIR radiation then passes through lens arrangements 1030 including the first reflective element 1031 and the transmissive element 1050 via apertures, as shown in FIG. 10. The structure and operations of the first reflective element 1031 are similar to those of the second reflective element 1040 as discussed above. Alternatively, there may not be apertures but the central portion of the various components may be transparent to MWIR allowing MWIR to pass through without being affected. In some embodiments, the MWIR radiation passes through a diversion lens 1080. The diversion lens 1080 may be optionally used as light may be collimated all the way through the transmissive element 1050. The MWIR radiation is mapped on the focal plane array 1020 at area 1092. Referring back to FIG. 8A, the MWIR radiation mapped on the focal plane array 1020 corresponds to the center area 820 as shown in FIG. 8A. In FIG. 10, entry and propagation of MWIR radiation are by way of example only and various other entries at different angles and resulting propagation are possible. Also, it should be noted that MWIR radiation propagation as shown in FIG. 10 is simplified for convenience of explanation.

As further shown in FIG. 10, LWIR radiation is reflected by the first reflective element 1031 which reflects the LWIR radiation to the second reflective element 1040. The second reflective element 1040 reflects the LWIR radiation toward the one or more transmissive elements 1050. The LWIR radiation then propagates through the transmissive element 1050 without interference with the MWIR radiation. The LWIR radiation is mapped onto the focal plane array 1020 in area 1094 by the transmissive element 1050. Referring back to FIG. 8A, the LWIR radiation mapped on the focal plane array 1020 corresponds to the outer circumference as shown in FIG. 8A. In FIG. 10, entry and propagation of LWIR radiation are by way of example only and various other entries at various angles and resulting propagation are possible. Also, it should be noted that LWIR radiation propagation as shown in FIG. 10 is simplified for convenience of explanation.

In other embodiments, the single imager 910 includes two lens systems where one lens receives MWIR and the other lens receives LWIR, as shown in FIG. 5. The difference between the structures illustrated in FIG. 5 and the single imager 910 may be found in a common FPA arranged with two lenses in the single imager. In FIG. 5, each imager is associated with the two separate FPAs, i.e., the MWIR FPA and the LWIR FPA, respectively.

In some embodiments, the FPA 1020 used in the single imager 900 includes a dual band FPA. As one example, the FPA 1020 includes a first layer that detects MWIR and a second layer underlying the first layer and detecting LWIR. In that case, LWIR is detected in an outer ring area of the FPA 1020 (the area 810 in FIG. 8A) and MWIR is detected in an inner center area (e.g., area 820 in FIG. 8A). As a non-limiting example, the FPA 1020 may include a dual band FPA as discussed in copending U.S. patent application Ser. No. 15/971,183 filed on May 4, 2018, which is a continuation of PCT Application serial No. PCT/US17/

043734 filed on Jul. 25, 2016 and claims the benefit of U.S. Provisional Applications Nos. 62/366,390 filed on Jul. 25, 2016 and 62/513,715 filed on Jun. 1, 2017, and entitled, "INFRARED DETECTOR DEVICES AND FOCAL PLANE ARRAYS HAVING A TRANSPARENT COMMON GROUND STRUCTURE AND METHODS OF FABRICATING THE SAME," disclosure of which are incorporated herein by reference with respect to disclosure of a dual band FPA. In the dual band FPA, each pixel has two layers. One layer detects a first wavelength band and another layer detects a second wavelength band. In some embodiments, a voltage bias is applied to individual pixels to select which wavelength band to detect.

In embodiments using the single band FPA as the FPA 1020, pixels within a certain region are configured to detect LWIR (such as the outer ring 810 as shown in FIG. 8A) and pixels within another region are configured to detect MWIR (such as the center region 820 as shown in FIG. 8A). For example, some pixels are configured to detect MWIR, and other pixels are configured to detect LWIR. More specifically, in a non-dual band base, each pixel can be dedicated to either MWIR or LWIR. In embodiments shown in FIG. 8A, for example, pixels in the center area 820 are dedicated to MWIR and pixels in the outer ring area 810 are dedicated to LWIR.

The LWIR radiation and the MWIR radiation mapped on the focal plane array as shown in FIG. 8A may provide information relating to object(s) present in the fields of view of the satellite onboard imaging system 10, 900 as shown in FIGS. 3 and 9. For example, information relating to object(s) present in the fields of view of the satellite onboard imaging system 10, 900 may be used to identify or recognize object(s), presence of object(s), movement of object(s) and tracking movement of object(s). Space applications utilize such information of objects for various purposes, for example, launch and tracking of a missile and space situation awareness.

Figure 11:
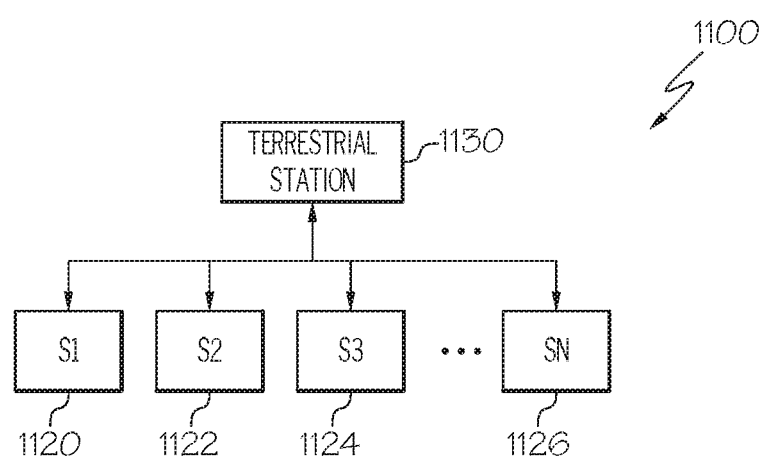
FIG. 11 depicts an exemplary block diagram of a communication system using a network of satellites according to embodiments described and illustrated herein.

FIG. 11 depicts an exemplary block diagram of a communication system 1100 using a network of satellites according to embodiments described herein. The communication system 1100 includes the network of satellites 1120, 1122, 1124, 1126 located at different points surrounding the Earth. The network of satellites can be arranged such that the Earth is completely viewed and covered by satellites. The communication system 1100 also includes a terrestrial station 1130 which is in communication with the network of satellites 1120, 1122, 1124, and 1126. The satellites 1120, 1122, 1124, 1126 includes onboard imaging systems which provide two different fields of view, as discussed above in connection with FIGS. 3 and 9. Thus, object(s) may be spotted in one or two fields of view of the imaging system of a first satellite 1120, and while object(s) and possibly the satellites are continuously moving, such object(s) may be spotted in the fields of view of other satellites 1122, 1124 and 1126. The information detected and collected by the network of satellites 1120, 1122, 1124, 1126 is transmitted to the terrestrial station 1130 located on the Earth. The terrestrial station 1130 processes and analyzes the information detected and collected by the network of satellites 1120, 1122, 1124, 1126 to calculate the position of object(s) and track the movement of object(s).

Figure 12:
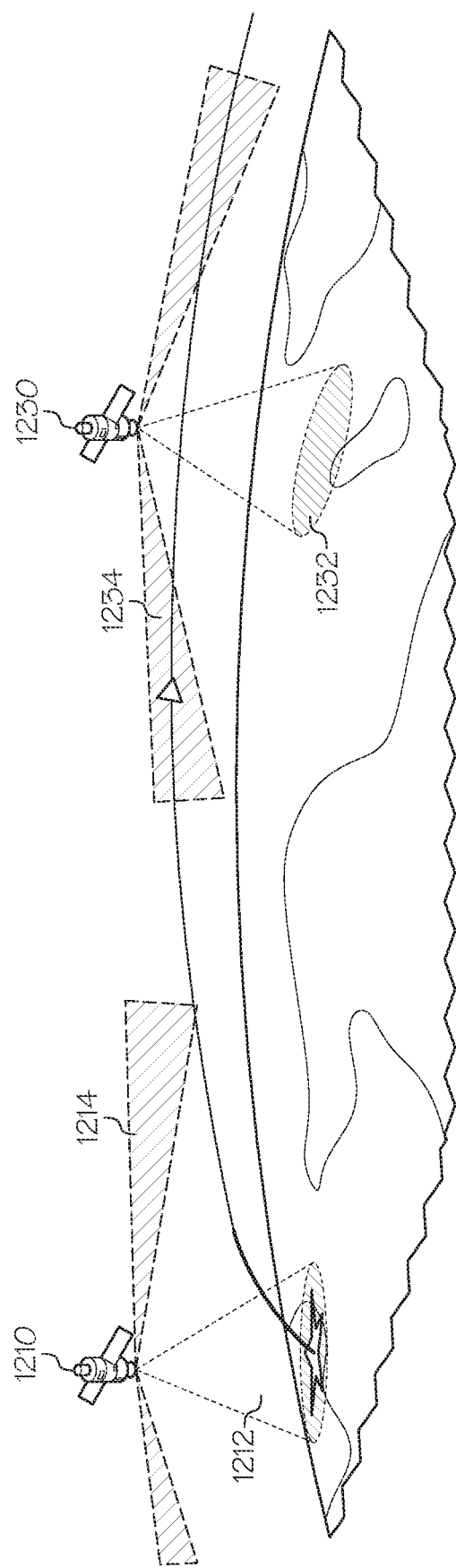
FIG. 12 depicts exemplary operations of the communication system of FIG. 11 for missile launch and missile detection during mid-course phase of flight using two satellites.

FIG. 12 depicts exemplary operations of the communication system 1100 of FIG. 11 for missile detection applications. For convenience of explanation, FIG. 12 illustrates two satellites 1210 and 1230, but the communication system 1100 is not limited thereto. More than two satellites 1210 and 1230 may be used and available based on needs for space applications. Referring to FIG. 12, an onboard imaging system of a first satellite 1210 has two fields of view including a MWIR look down field of view 1212 and a LWIR toroidal field of view 1214, as discussed in detail above in connection with FIGS. 1-3 and 9. Similarly, an onboard imaging system of a second satellite 1230 also has two fields of view including a MWIR look down field of view 1232 and a LWIR toroidal field of view 1234.

In FIG. 12, information detected and collected by the onboard imaging systems of the first and the second satellites 1210 and 1230 is used for missile detection among various space applications. A single satellite onboard imaging system may detect a direction of a missile to a target. In order to detect a position of the missile, two or more satellites that have the missile in their panoramic fields of view. As one example, as shown in FIG. 12, a missile is launched in a location on the Earth proximate to the first satellite 1210. The missile launch is within the MWIR look down field of view 1212 of the onboard imaging system of the first satellite 1210. Upon the missile launch, detection of MWIR radiation may take place and appears in the MWIR look down field of view 1212 which in turn appears on a display device, a warning system, or any device of a launch detection system. Once the missile launch is detected, launch site information and a missile trajectory may be used to gather data from the LWIR imager(s) that have the missile in the field of view.

A missile goes through several phases of flight, including a boost phase, a mid-course phase which represents most of the flight, and a terminal phase where a warhead approaches a target. The mid-course phase of flight may involve the longest time of flight which may be used to detect a warhead, but it has been difficult to detect the warhead due to many factors that include distinguishing the target from the Earth background, propagation of certain bands of energy through the atmosphere, etc. In other words, it has been difficult and unsolved to detect and track the warheads during the mid-course portion of flight. The communication system 1100 including the network of satellites 1120, 1122, 1124, 1126 and the terrestrial station 1130, as shown in FIG. 11 may detect and/or track warheads during the mid-course phase of flight and may address this ongoing problem.

Referring back to FIG. 12, the separated warhead enters into the LWIR toroidal field of view 1214 of the onboard imaging system of the first satellite 1210. As discussed above, the missile launch has been detected by the MWIR detecting imager. The warhead keeps flying and enters into the field of view 1234 of the onboard imaging system of the second satellite 1230. Each satellite 1210, 1230 determines parameters of the line between the satellite 1210, 1230 and the missile. The line from the satellite 1210 and the line from the satellite 1230 intersect and the satellites 1210 and 1230 send the line intersection information to the terrestrial station 1130. In some embodiments, the satellites 1210, 1230 may send direction vector information and the terrestrial station 1130 may calculate the intercept point. In some embodiments, a computer system at the terrestrial station 1130 updates the intersection information frequently as the satellites 1210 and 1230 send out the updated information. That way, the flight path of the missile is detected and updated and the exact location of the missile may be determined in some embodiments.

In other embodiments, determining the target (missile impact) location from a portion of the trajectory may be possible for certain types of missiles. More advanced missiles can change directions, meaning the entire trajectory may not be determined from a portion of the trajectory.

Figure 13:
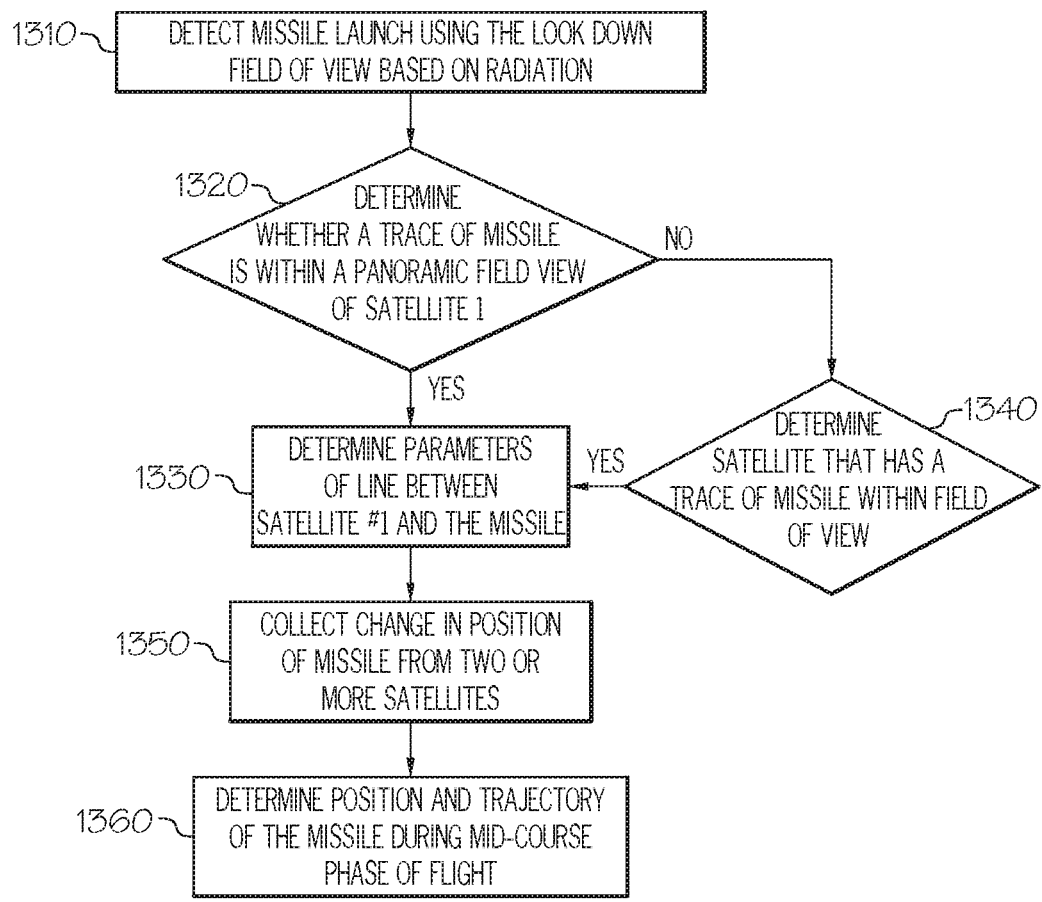
FIG. 13 depicts an exemplary flow chart showing operations of the communication system of FIG. 11 according to embodiments described and illustrated herein.

In FIG. 12, two satellites 1210 and 1230 are used to detect the location of the missile during mid-course phase of flight, but the present disclosure is not limited thereto. Three or more satellites can be included and send parameters of the line between each satellite and the missile and the information from all satellites that detect the missile can be used to calculate the missile position and trajectory. Information from two satellites, as shown in FIG. 12, may be used to calculate the missile position and trajectory, and information from more than two satellites can be used to improve the missile location. FIG. 13 depicts an exemplary flow chart showing operations of the communication system 1110 of FIG. 11 according to embodiments described herein. The communication system 1110 may be referred to as a warning system that includes a communication system and an infrared detection system. In block 1310, the missile launch is detected in the look-down field of view 1212 of the onboard imaging system of the first satellite 1210 based on MWIR radiation. Once the missile launch is detected, launch site information and a missile trajectory may be used to turn on (or otherwise access data from) the LWIR imager(s) that have the missile in the field of view. More specifically, the LWIR imager could be looking for a missile independent from the MWIR imager, or if the MWIR imager detects a launch and gets a track, it could cue the LWIR imager to look for a missile along an estimated position.

In block 1320, it is determined whether a trace of the moving missile is within the panoramic field of view 1214 of the onboard imaging system of the first satellite 1210. In block 1330, upon detection of the trace of the moving missile in the panoramic field of view 1214, the satellite 1210 determines parameters of the line between the satellite 1210 and the missile. The line information is transmitted to the terrestrial station 1130 (FIG. 11). In some embodiments, the satellite 1210 may send direction vector information. Upon no detection of the trace of the moving missile in the field of view 1214, it is determined whether an onboard imaging system located in the network of other satellites may have information relating to the trace of the moving missile within the fields of view thereof (block 1340). By way of example, the second satellite 1230 could receive a cue from another satellite such as the first satellite 1210 that has detected a launch, with the cue prompting a satellite to look for a missile with its LWIR imager.

Upon detection of the trace of the moving missile by one or more of the network of other satellites (block 1340), those satellites determine parameters of the line between the satellites and the missile (block 1330) and the information is also transmitted to and collected at the terrestrial station 1130 (block 1350). In block 1360, the terrestrial station 1130 may analyze the transmitted information and calculate the position and trajectory of the missile during mid-course phase of flight. Accordingly, the mid-course detection and tracking of the missile is accomplished. In other embodiments, the satellites 1210, 1230 may send direction vector information and the terrestrial station 1130 may calculate the intercept point. Generally, based on the detected energy in the MWIR and/or LWIR focal plane arrays, the system will determine the direction from the satellite to the missile. Then, using two or more of these direction vectors from different satellites, the location of the missile can be determined by determining where the direction vectors intersect. Tracking the location over time allows a trajectory to be determined.

Figure 14:
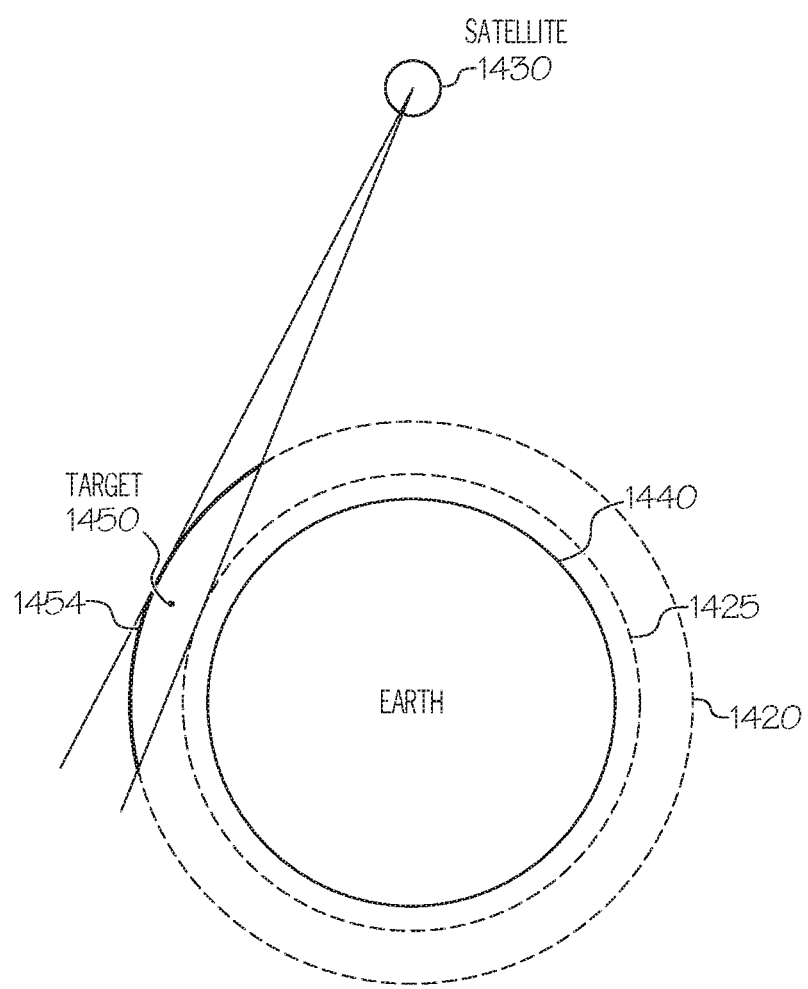
FIG. 14 depicts an exemplary detection range of a target by a satellite having an onboard imaging system, according to embodiments described and illustrated herein.

As discussed above, detection of missiles during mid-course is accomplished by use of a LWIR focal plane array. Independent radiometric analysis shows the following system parameters relevant in addressing detection of missiles during mid-course phase of flight. The following system parameters are by example only and the present disclosure is not limited to the following parameters:

Low Earth Orbit (LEO) parameters
Number of satellites required
Probability that a missile is in the field of view of multiple satellites
Expected missile temperatures, emissivity, dimensions and flight trajectory values
Focal plane array pixel pitch, number of pixels, dark current, quantum efficiency, fill-factor, and integration time
Required well capacity of detectors
Effects resulting from inoperable pixels
Required lens focal length and F-number (F/#)
Transmission of optical elements
Required signal-to-noise ratio for detection
Electronic noise
Shot noise
Noise associated with deep-space background
Ensquared energy effect due to diffraction and optical lens aberrations
Effect of satellite pointing error FIG. 14 illustrates one exemplary missile detection using a maximum altitude of detection path for a target shown on the FPA, according to embodiments described herein. More particularly, FIG. 14 shows Earth 1440, a satellite 1430, altitude of atmosphere 1425 which may also correspond to a minimum altitude of target detection if the energy traveling from the missile to the satellite must pass through a significant length of the atmosphere, and a maximum altitude 1420 to be able to detect a target 1450. In some embodiments, the maximum altitude 1420 may mean the maximum altitude to be expected to see the target 1450. From the satellite 1430, a first line 1425 indicates the minimum altitude from the surface of the Earth where a target can be detected. A second line 1420 indicates the maximum altitude from the surface of the Earth which is expected to see a target. Infrared radiation is likely to be absorbed and lost in the atmosphere and the first line 1425 is set to correspond to the top altitude of the atmosphere. For this reason, the first line 1425 may not correspond to the surface of the Earth.

Depending on the satellite and onboard imaging system configurations and objects to be expected to be detected, a distance between the first line and the second line 1420, a focal length between the lens and an infrared imaging sensor for detecting LWIR, a number of pixels of the infrared imaging sensor determined degrees of field of view, pixels resolution of the infrared image sensor along the FPA radial and an annular ring circular detection, may be selected and changed.

In FIG. 14, a signal-to-noise ratio (SNR) may affect the detection range the satellite onboard image sensing system may achieve. For instance, if a target can be detected if the SNR is larger than a particular threshold value, the target may be detected while travelling in 100% of the area defined by the solid line portion of arc 1454. As another example, percentage of the area defined by the solid line portion of arc 1454 may change as the SNR changes. These percentages are based on the target 1450 operating at the temperature of 300K or lower. If the operating temperature of the target 1450 is higher than 300K, further detection beyond the maximum altitude is possible.

The system architectures described above in connection with FIGS. 3, 9, 11, 12 have several advantages over existing missile detection and space situational awareness systems.

The advantages involve distributed assets, e.g., the network of satellites and therefore, the system is less vulnerable to malfunction of one or more satellites and provides inherent redundancy. The advantages further include 4-fold detection capability on the same satellite. The 4-fold detection capability includes (1) missile launch detection, (2) mid-course missile detection and tracking, (3) ability to detect atmospheric skimming threats (current high threat vulnerability), and (4) fulfilling space situational awareness mission.

As the system architecture provides the panoramic field of view which encompasses 360 degree look out and around, movement of optical components to step over different areas of the Earth is no longer required. As a MWIR detector, strained layer sub-lattice structure may be used and therefore, it is possible to provide low size, weight and power (SWaP) configurations. Additionally, higher FPA operating temperatures than some traditional detector materials can be used based on the strained layer sub-lattice structure that permits reduction in size, weight and power of mechanical cryogenic cooling system.

The system architecture can operate in a low Earth orbit (LEO) which permits smaller optics for equivalent detection in geostationary orbit (GEO) and this may enable smaller satellites than are currently available. Additionally, the system architectures may potentially significantly reduce system cost. The advantages further include that the system architecture may not experience outages due to step-and-stare or bad pixels, as occurs in some current GEO based detectors of focal plane arrays.

As illustrated above, the embodiments disclosed herein include systems and methods for detecting an object with infrared sensing systems having two different fields of view. The infrared sensing systems are boarded on a satellite. One of the different fields of view includes a panoramic view covering 360 degree out around a satellite. Some embodiments of the infrared sensing systems include a pair of detector FPAs. In other embodiments of the infrared sensing systems includes a single FPA. The infrared sensing systems detect midwave infrared radiation and longwave infrared radiation. Different infrared bands are associated with different fields of view. In some embodiments, one field of view is associated with detection of midwave infrared radiation, and the other field of view is associated with detection of longwave infrared radiation.

The detection of longwave infrared radiation in the 360 degree panoramic view facilitates several space applications including space situational awareness and a missile launch and tracking. For instance, the detection of longwave infrared radiation in the 360 degree panoramic view with at least two satellites enables a position and a trajectory of a missile to be determined during mid-course phase of flight of the missile.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for detecting indications of thermal energy of an object with infrared sensors having two different fields of view including a panoramic 360 degree field of view. It should also be understood that these embodiments are merely exemplary and are not intended to limit the scope of this disclosure.

The invention claimed is:

1. A satellite onboard imaging system comprising:
an infrared sensing system comprising:
a first imager configured to have a first field of view that observes a look-down field of view of the Earth from a satellite and operable to generate a first thermal image signal; and
a second imager configured to have a second field of view different from the first field of view that observes a toroidal field of view centered at the satellite and operable to generate a second thermal image signal; and
a controller coupled to the infrared sensing system and operable to process the first thermal image signal from the first imager and the second thermal image signal from the second imager, the controller operable to output indications of thermal energy of an identical, or different, objects based on the first thermal image signal, the second thermal image signal, or both.

2. The system of claim 1, wherein the second imager further comprises:
an annulus lens system; and
a focal plane array that detects longwave infrared radiation;
wherein the annulus lens system maps the longwave infrared radiation onto a two-dimensional plane of the focal plane array.

3. The system of claim 1, wherein the second imager comprises a longwave infrared focal plane array and the first imager comprises an infrared focal plane array that detects an infrared waveband shorter than longwave infrared.

4. The system of claim 3, wherein the first imager detects midwave infrared radiation within the look-down field of view and the second imager detects longwave infrared radiation within the toroidal field of view.

5. The system of claim 1, further comprising a single focal plane array comprising a first area having pixels configured to detect midwave infrared radiation, and a second area having pixels configured to detect longwave infrared radiation.

6. The system of claim 5, wherein the pixels of the single focal plane array are dual band pixels.

7. A satellite onboard imaging method, comprising:
detecting, with a satellite onboard imaging system, MWIR radiation from the Earth within a look-down field of view from a satellite;
generating a first thermal image signal based on the detected MWIR radiation;
detecting, with the satellite onboard imaging system, LWIR radiation from an annulus above the surface of the Earth within a toroidal field of view from the satellite, wherein the toroidal field of view is different from the look-down field of view;
generating a second thermal image signal based on the detected LWIR radiation;
processing the first thermal image signal and the second thermal image signal; and
outputting an indication of thermal energy based on the first thermal image signal, the second thermal image signal, or both.

8. The satellite onboard imaging method of claim 7, further comprising:

analyzing the first thermal image signal to capture first set of information of a first object within the look-down field of view; and analyzing the second thermal image signal to capture second set of information of a second object within the toroidal field of view.

9. The satellite onboard imaging method of claim 7, further comprising:

detecting the MWIR radiation further comprises detecting the MWIR radiation with a first infrared sensor; and detecting the LWIR radiation further comprises detecting the LWIR radiation with a second infrared sensor.

10. The satellite onboard imaging method of claim 9, further comprising:

detecting, with the satellite onboard imaging system, MWIR radiation of a missile within the look-down field of view;

detecting, with the satellite onboard imaging system, LWIR radiation of the missile within the toroidal field of view;

analyzing the first thermal image signal to determine launch of the missile; and analyzing the second thermal image signal to determine a flight direction of the missile.

11. The satellite onboard imaging method of claim 10, further comprising:

detecting, with the individual imaging system boarded on a network of satellites, LWIR radiation of the missile moving through the toroidal field of view of the individual imaging system; and determining a position and a trajectory of the missile during the mid-course phase of flight of the missile based on the second thermal image signal from the network of satellites.

12. The satellite onboard imaging method of claim 7, wherein detecting the MWIR radiation and the LWIR radiation is performed with a single focal plane array.

13. The satellite onboard imaging method of claim 7, further comprising detecting infrared radiation resulting from an identical object moving through a toroidal view of the onboard imaging system of at least two satellites having different fields of view of the Earth.

* * * * *